(12) United States Patent
Au et al.

(10) Patent No.: US 8,611,830 B2
(45) Date of Patent: Dec. 17, 2013

(54) TRANSCEIVER PORT APPARATUS AND METHOD

(75) Inventors: Gabriel K. Au, Aiea, HI (US); Robert D. Yamashita, Kaneohe, HI (US); Kin Ho Tung, Honolulu, HI (US)

(73) Assignee: Spirent Communications, Inc., Sunnyvale, CA (US)

( * ) Notice: Subject to any disclaimer, the term of this patent is extended or adjusted under 35 U.S.C. 154(b) by 137 days.

(21) Appl. No.: 13/327,426

(22) Filed: Dec. 15, 2011

(65) Prior Publication Data

US 2013/0156077 A1     Jun. 20, 2013

(51) Int. Cl.
*H04B 1/40*     (2006.01)

(52) U.S. Cl.
USPC ...... 455/74.1; 455/74; 455/556.1; 455/556.2; 455/557; 455/63.1; 455/67.11; 455/67.13; 455/67.15; 375/219; 375/220; 710/1; 710/8; 710/11; 710/14; 710/62; 398/135; 398/136; 398/138; 398/128

(58) Field of Classification Search
USPC .......... 455/63.1, 67.11, 67.13, 67.15, 73, 74, 455/74.1, 556.1, 556.2, 557, 558, 559; 375/219, 220; 710/1, 2, 5, 7, 8, 10, 11, 710/14, 20, 33, 62, 63, 64, 65; 398/135, 398/136, 137, 138, 139, 128, 130
See application file for complete search history.

(56) References Cited

U.S. PATENT DOCUMENTS

| | | | |
|---|---|---|---|
| 6,996,390 B2 * | 2/2006 | Herley et al. | 455/345 |
| 8,161,332 B2 * | 4/2012 | Skirmont et al. | 714/704 |
| 8,380,246 B2 * | 2/2013 | Wilson et al. | 455/556.1 |
| 8,412,051 B2 * | 4/2013 | El-Ahmadi et al. | 398/135 |
| 8,499,103 B2 * | 7/2013 | Carter et al. | 710/11 |
| 2002/0114597 A1 * | 8/2002 | Brimacombe et al. | 385/123 |
| 2004/0197105 A1 * | 10/2004 | Khatana et al. | 398/173 |
| 2011/0135312 A1 * | 6/2011 | El-Ahmadi et al. | 398/135 |
| 2012/0051735 A1 * | 3/2012 | Achkir et al. | 398/16 |

* cited by examiner

*Primary Examiner* — Tuan A Tran
(74) *Attorney, Agent, or Firm* — Kenta Suzue; Haynes Beffel & Wolfeld LLP

(57) ABSTRACT

Various embodiments relate to an apparatus that converts between CFP signals and electrical CXP signals. Circuitry compensates for attenuation of a CXP interconnect connected to a CXP transceiver port, and converts between (i) electrical CXP signals of the CXP transceiver port (the electrical CXP signals compliant with the CXP specification), and (ii) CFP signals of the CFP transceiver port (the CFP signals compliant with the CFP specification).

25 Claims, 7 Drawing Sheets

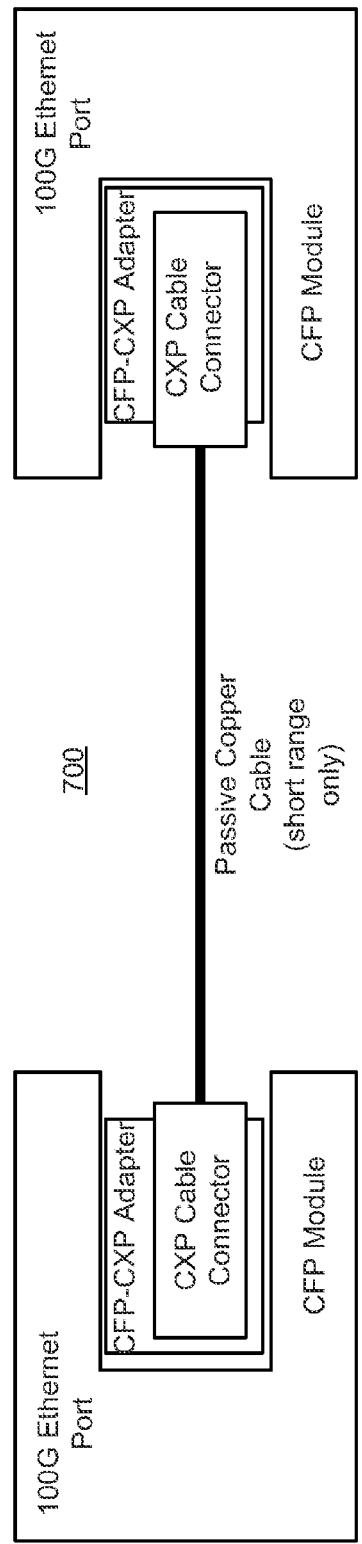
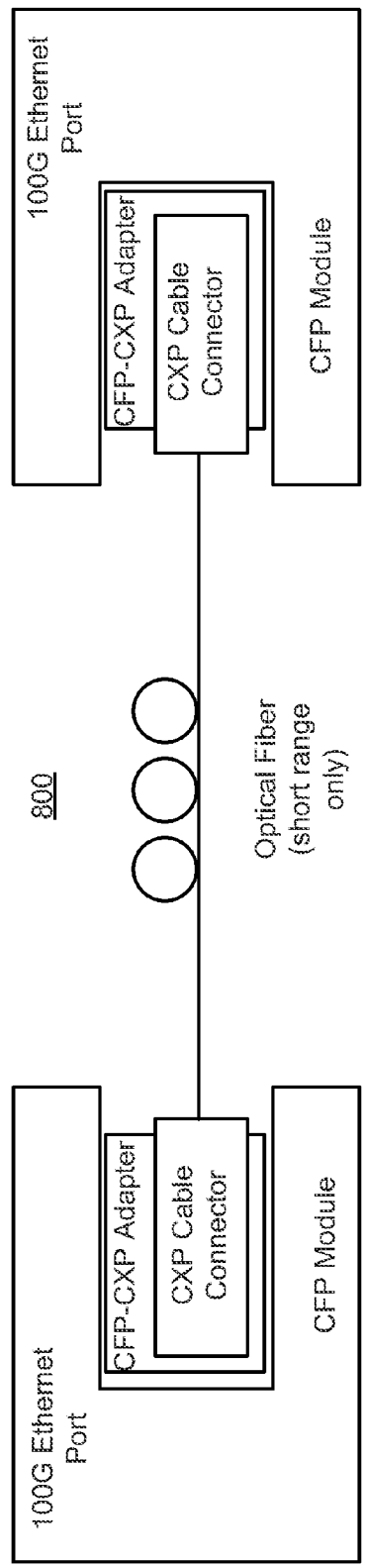

TRANSCEIVER PORT APPARATUS AND METHOD

BACKGROUND

1. Field of the Invention

This technology relates to physical ports for 100 Gigabit Ethernet networking equipment.

2. Description of Related Art

Designs for 100 Gigabit Ethernet networking equipment generally include one of two physical ports, the CFP MSA (C Form-factor Pluggable MultiSource Agreement) and the CXP standard (C eXtended-capability Pluggable form factor), where C can indicate the Roman numeral for 100, corresponding to 100 Gigabit.

The CFP MultiSource agreement is an industry standard that supports various different fiber optic interconnects, including 100 G Base LR4, 100 G Base SR10 and 100 G Base LR10. These fiber optic interconnects support short haul (100 m) or long haul (10 km) connections at price points between ranging between $10,000 to $25,000. Despite these high costs, 100 Gigabit Ethernet networking equipment includes CFP ports as the only industry option for long haul connections.

The alternative to CFP is CXP. CXP has a huge cost advantage, since it supports passive copper connections using cables that cost less than $200. The drawback is that there are no long haul optical options available to CXP. Even the optical implementations of CXP are limited to 100 m or less.

Designs for 100 Gigabit Ethernet networking equipment could include both a CFP port and a CXP port, but this approach has disadvantages. First, this approach greatly increases the complexity and cost of the PCB (printed circuit board) interconnects inside the device, because of the many required fast data multiplexers to switch between the CFP port and the CXP port. This approach also takes up additional physical space on the front panel of the equipment. In many networking devices, port density and front panel space is at a premium, discouraging this approach. Also for this reason, any approach should require as few ports as possible.

An existing solution uses an optical interface module and optical cable costing in excess of about $20,000. Such high costs discourage and slow the adoption of 100 Gigabit networking equipment. It would be desirable if such costly optical solutions could be replaced with a cheaper alternative, that in turn would speed adoption of 100 Gigabit networking equipment. Another existing solution is limited to 40 Gbps (gigabits per second) and is unable to compensate for the varied attenuation of different lengths of cable.

SUMMARY

Various embodiments relate to a CFP to CXP adapter. With such an adapter, 100 Gigabit Ethernet networking equipment can include CFP ports for long haul applications, and yet retain the flexibility of the CXP port. The CXP port supports low cost, short reach connections that are useful during the design and debug phase of the 100 Gigabit Ethernet networking equipment, as well as during manufacturing testing of the 100 Gigabit Ethernet networking equipment. Even if the primary purpose of the 100 Gigabit Ethernet networking equipment is for use in long haul networks that require the CFP port, in certain situations the availability of a low cost copper interconnect that requires the CXP port is useful.

One aspect of the technology is a transceiver adapter with a housing that includes a CXP transceiver port operating at least at 100 Gbps, a CFP transceiver port operating at least at 100 Gbps, and circuitry compensating for attenuation of a CXP interconnect connected to the CXP transceiver port, and converting between electrical CXP signals of the CXP transceiver port, and CFP signals of the CFP transceiver port.

The CXP transceiver port and the electrical CXP signals are compliant with a CXP specification. The CFP transceiver port and the CFP signals are compliant with a CFP specification.

Another aspect of the technology is an apparatus is a networking device having an Ethernet port operating at least at 100 Gigabits. The networking device includes a CFP module, which is coupled to a transceiver adapter as described herein.

In one embodiment, the circuitry includes a microcontroller that configures clock and data recovery settings for converting between the electrical CXP signals and the CFP signals.

In one embodiment, the transceiver adapter relies on circuitry external to the transceiver adapter (for example, in the networking device) to control clock and data recovery settings for converting between the electrical CXP signals and the CFP signals.

In one embodiment, the circuitry converting between signals, includes clock and data recovery circuitry configured based on attenuation data characterizing a CXP interconnect coupled to the CXP transceiver port. The attenuation data can be stored on the CXP interconnect, such as in a memory at the connector of the CXP interconnect.

In one embodiment, the CFP specification describes any CFP variant including any of CFP, CFP2, CFP4, or other variant of CFP.

In one embodiment, the CFP specification is a C Form-factor Pluggable MultiSource Agreement specification.

In one embodiment, the CXP specification is any CXP variant including any of CXP, CXP2, or other variant of CXP.

In one embodiment, the CXP specification is a C eXtended-capability Pluggable form factor specification.

Another aspect of the technology is a method of:
compensating for attenuation of a CXP interconnect connected to a CXP transceiver port operating at least at 100 Gbps,
converting between (i) electrical CXP signals of a CXP transceiver port and (ii) CFP signals of a CFP transceiver port operating at least at 100 Gbps, the CFP signals compliant with the CFP specification. The CXP transceiver port and the CFP transceiver port in a same transceiver adapter housing. The CXP transceiver port and the electrical CXP signals are compliant with a CXP specification. The CFP transceiver port and the CFP signals are compliant with a CFP specification.

One embodiment further includes, configuring clock and data recovery circuitry settings in the transceiver adapter for converting between the electrical CXP signals and the CFP signals, with a microcontroller in the transceiver adapter housing.

One embodiment further includes, configuring clock and data recovery circuitry settings in the transceiver adapter for converting between the electrical CXP signals and the CFP signals, with a networking device external to the transceiver adapter.

One embodiment further includes, configuring clock and data recovery circuitry settings in the transceiver adapter for converting between the electrical CXP signals and the CFP signals, based on attenuation data characterizing a CXP interconnect coupled to the CXP transceiver port. The attenuation data are stored on the CXP interconnect.

Another aspect of the technology is a method of:
attaching, to a first CFP port of networking equipment undergoing test, a second CFP port of an apparatus that converts between (i) electrical CXP signals of the CXP transceiver port, the electrical CXP signals compliant with the CXP specification, and (ii) CFP signals of the CFP transceiver port, the CFP signals compliant with the CFP specification;
attaching, to a first CXP port of the apparatus, a CXP interconnect; and
automatically configuring the apparatus to compensate for attenuation of the CXP interconnect.

In one embodiment, regular operation requires no ports of the apparatus besides the second CFP port of the apparatus and a CXP port of the apparatus. For example, just the CFP port, or just the CXP port, or just the CFP port and the CXP port are sufficient.

Various embodiments for the various aspects are discussed herein.

BRIEF DESCRIPTION OF THE DRAWINGS

FIG. 7 shows passive copper cable as a 100 Gigabit Ethernet interconnect between 100 Gigabit Ethernet ports of networking equipment.

FIG. 8 shows optical fiber as a 100 Gigabit Ethernet interconnect between 100 Gigabit Ethernet ports of networking equipment.

DETAILED DESCRIPTION

Figure 1:
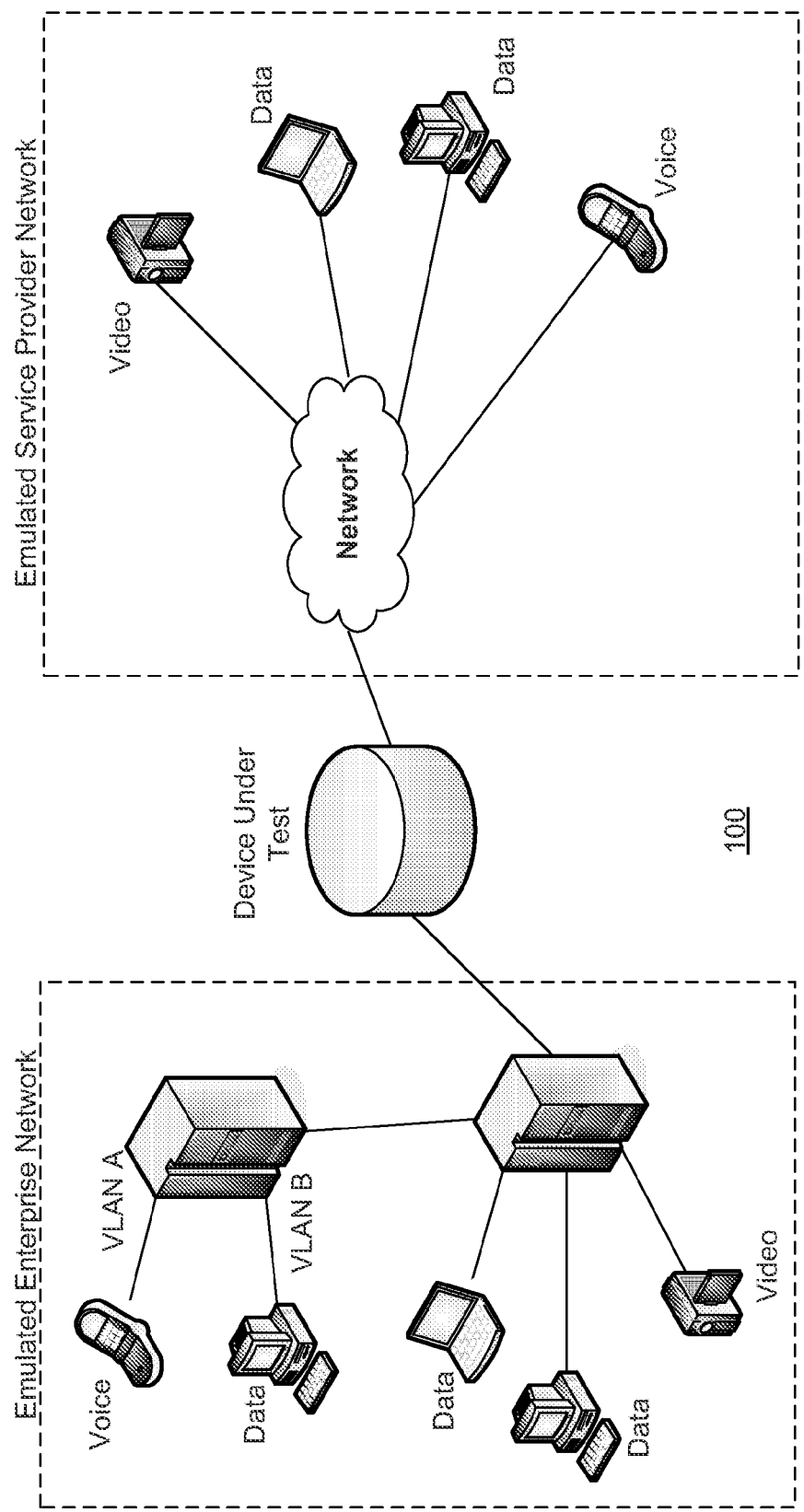
FIG. 1 is an example simplified network test topology with emulated enterprise and emulated service provider networks.

FIG. 1 is an example simplified network test topology 100 with emulated enterprise and emulated service provider networks. The disclosed adapter technology can work with test equipment that emulates a network. The disclosed adapter can work with the device under test, which can be 100 Gigabit Ethernet networking equipment or other networking equipment with a CXP port or CFP port.

Depicted is a sample test topology for layer 2-3 switching and routing between enterprise networks and service provider networks. The device under test, such as an enterprise router or metro router, sits between the emulated networks. In this figure, the emulated enterprise network includes virtual LAN or "VLAN" segments. Traffic on the enterprise network includes voice, data and video. On the emulated service provider in our side of the DUT, sources of voice, data and video content are represented. The switching and routing devices in this scenario may support a large number of layer 2/3 technologies, including different virtual LAN encapsulations, various quality of service ("QOS") schemes, and dual-stack IPv6/IPv4 forwarding. Testing is particularly useful because each new feature or protocol increases the risk of functional or performance problems, many of which are hard to find without creating and analyzing a wide range of traffic scenarios.

In another test topology, the DUT itself includes an actual, nonemulated enterprise network or an actual, nonemulated service provider network.

Figure 2:
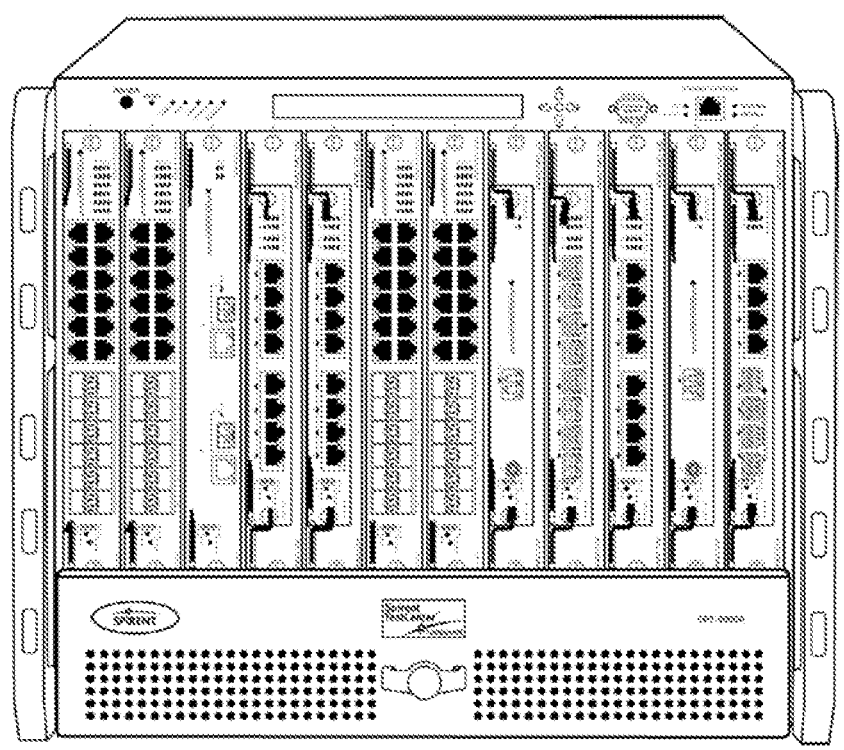
FIG. 2 is a line drawing of an example network test chassis to emulate networks, such as in FIG. 1.

FIG. 2 is a line drawing of an example network test chassis 200 to emulate networks, such as in FIG. 1.

Shown is a line drawing of a Spirent™ test chassis. The Spirent TestCenter is a family of network test systems emulating network topologies, such as the emulated enterprise network and emulated service provider network shown in FIG. 1. Members include the SPT-5000A, a high density network performance test system and the portable SPT-2000A/HS. Among this family, the SPT-9000A is the very high density test member typically used in the lab or a production test environment.

This test system is highly suitable, where high density Ethernet ports are desired for high-volume production and large port count testing. This test system has 12 vertical slots that can support a variety of module configurations. For instance, the chassis can be filled with up to 144 10/100/1000 Mb per second Ethernet ports. Or, it can be filled with 144 fiber or dual media gigabit Ethernet ports. It can support up to 24 10-gigabit Ethernet ports, 24 UniPHY (10 GbE/OC-192 POS) ports, 24 WAN OC-48/12/3 POS ports or 24 10 GBASE-T ports. Also, 40 GbE and 100 GbE ports are supported. FIG. 1 depicts various modules supporting a mix of port types.

The Spirent TestCenter™ is one example of integrated performance analysis and service assurance systems that enable the development and deployment of next-generation networking technology, such as Internet telephony, broadband services, 3G wireless, global navigation satellite systems and network security equipment. The technology described in this disclosure applies to Spirent TestCenter™ products and generally to IP performance test systems and service verification platforms for IP-based infrastructure and services. This technology is useful in systems that test and validate performance and scalability characteristics of next-generation networking technology for voice, video and data services. Test devices, using the technology disclosed, are useful to network and telephony equipment manufacturers, semiconductor manufacturers, service providers, government departments, and enterprises to validate the capabilities and reliabilities of complex IP networks, devices and applications, such as networks for delivery of triple play packages that include voice, and video and data services. The technology disclosed is useful in testing both control plane and data plane traffic.

Figure 3:
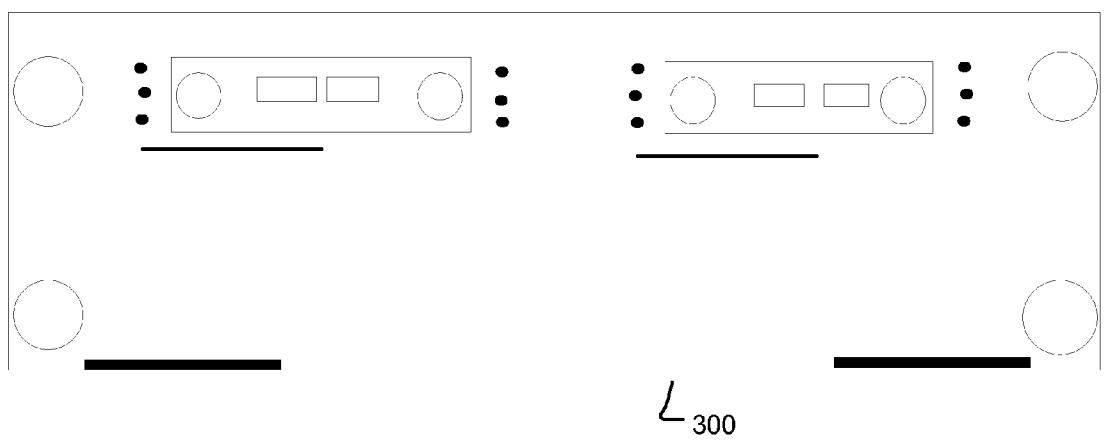
FIG. 3 is a picture of a test module that can be inserted into a chassis such as in FIG. 2.

FIG. 3 is a picture of a test module that can be inserted into a chassis such as in FIG. 2.

The test module is for the chassis 300, for example the Spirent™ SPT-9000A test chassis. The test module emulates a network such as the enterprise network or service provide network as in FIG. 1. The shown test module is the Spirent Hypermetrics™ test module. The test module has CFP ports and the CXP to CFP adapter.

Figure 4:
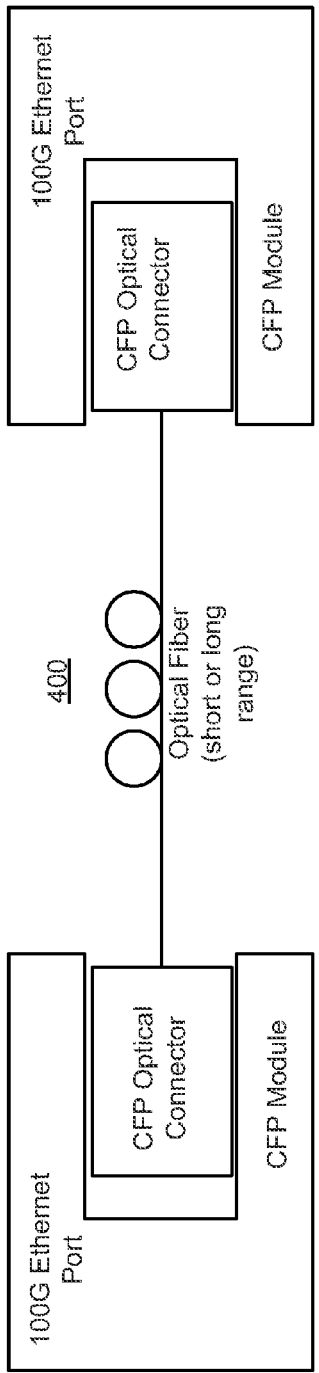
FIG. 4 shows optical fiber as a 100 Gigabit Ethernet interconnect between 100 Gigabit Ethernet ports of networking equipment.
Figure 5:
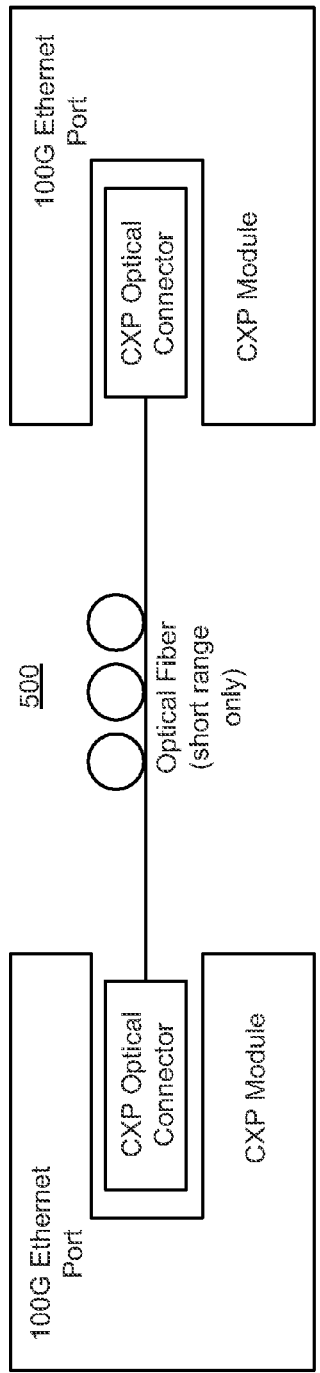
FIG. 5 shows optical fiber as a 100 Gigabit Ethernet interconnect between 100 Gigabit Ethernet ports of networking equipment.
Figure 6:
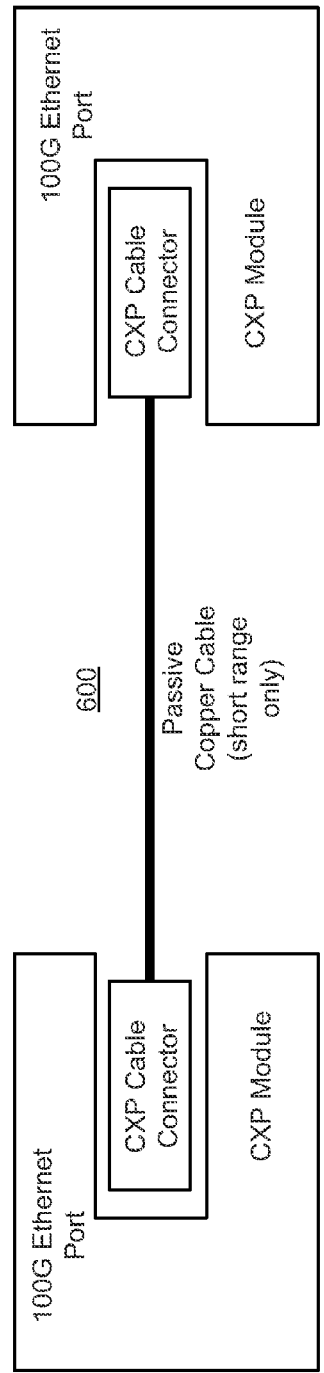
FIG. 6 shows passive copper cable as a 100 Gigabit Ethernet interconnect between 100 Gigabit Ethernet ports of networking equipment.

FIGS. 4-6 show different combinations of port—CFP or CXP—and interconnect—optical fiber or copper.

FIG. 4 shows a combination 400 of optical fiber as a 100 Gigabit Ethernet interconnect between 100 Gigabit Ethernet ports of networking equipment. The optical fiber is either long haul or short haul. The optical fiber is terminated on both ends with a CFP optical connector. The CFP optical connector on both ends is connected to the CFP receptacle of a CFP module.

FIG. 5 shows a combination 500 of optical fiber as a 100 Gigabit Ethernet interconnect between 100 Gigabit Ethernet ports of networking equipment. The optical fiber is short haul only. The optical fiber is terminated on both ends with a CXP optical connector. The CXP optical connector on both ends is connected to the CXP receptacle of a CXP module.

FIG. 6 shows a combination 600 of passive copper cable as a 100 Gigabit Ethernet interconnect between 100 Gigabit Ethernet ports of networking equipment. The passive copper cable is short haul only. The passive copper cable is terminated on both ends with a CXP cable connector. The CXP cable connector on both ends is connected to the CXP receptacle of a CXP module.

FIGS. 7-8 show a CFP port, a CFP-CXP adapter in a housing, and different interconnects—optical fiber or copper.

FIG. 7 shows a combination 700 of passive copper cable as a 100 Gigabit Ethernet interconnect between 100 Gigabit Ethernet ports of networking equipment. The passive copper cable is short haul only. The passive copper cable is terminated on both ends with a CXP cable connector. The CXP cable connector on both ends is connected to a CFP-CXP adapter. The CFP-CXP adapter on both ends is connected to the CFP receptacle of a CFP module.

In another embodiment, the CXP cable connector on one end is connected to a CFP-CXP adapter which is connected to the CFP receptacle of a CFP module. The CXP cable connector on the other end is connected to the CXP receptacle of a CXP module.

FIG. 8 shows a combination 800 of optical fiber as a 100 Gigabit Ethernet interconnect between 100 Gigabit Ethernet ports of networking equipment. The passive copper cable is short haul only. The optical fiber is terminated on both ends with a CXP cable connector. The CXP cable connector on both ends is connected to a CFP-CXP adapter. The CFP-CXP adapter on both ends is connected to the CFP receptacle of a CFP module.

In another embodiment, the CXP cable connector on one end is connected to a CFP-CXP adapter which is connected to the CFP receptacle of a CFP module. The CXP cable connector on the other end is connected to the CXP receptacle of a CXP module.

Figure 9:
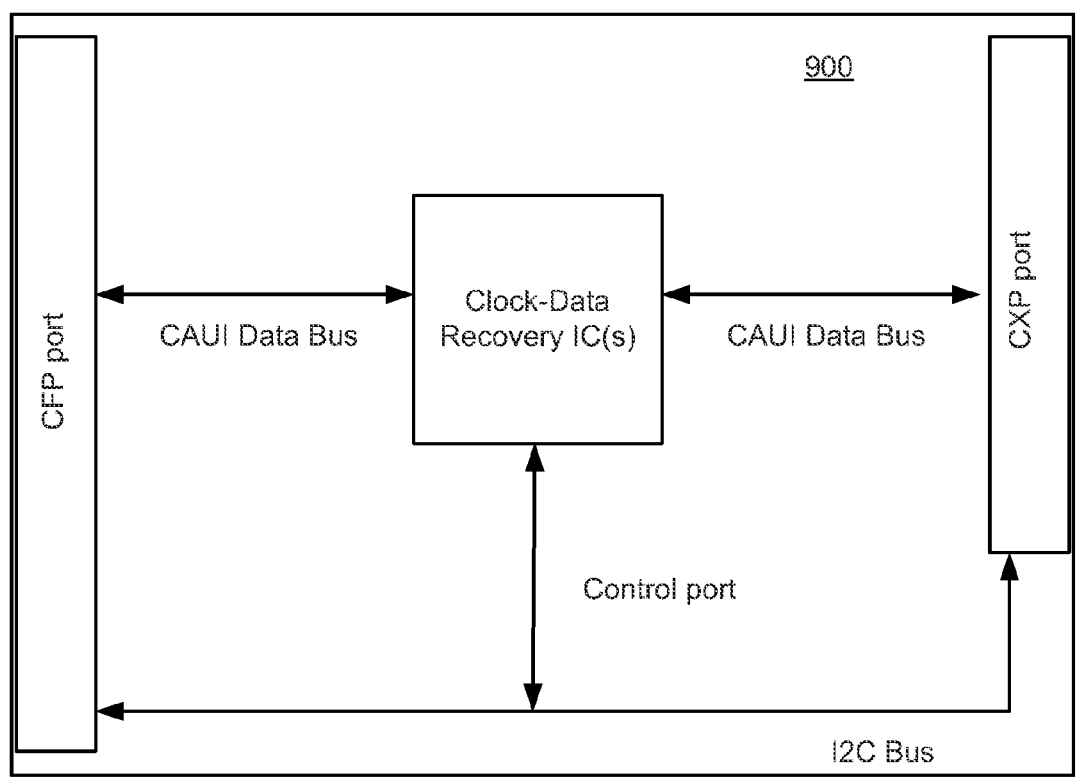
FIG. 9 shows a block diagram of a version of the CFP-CXP adapter with control circuitry for the CDR ICs in the 100 Gigabit networking equipment.
Figure 10:
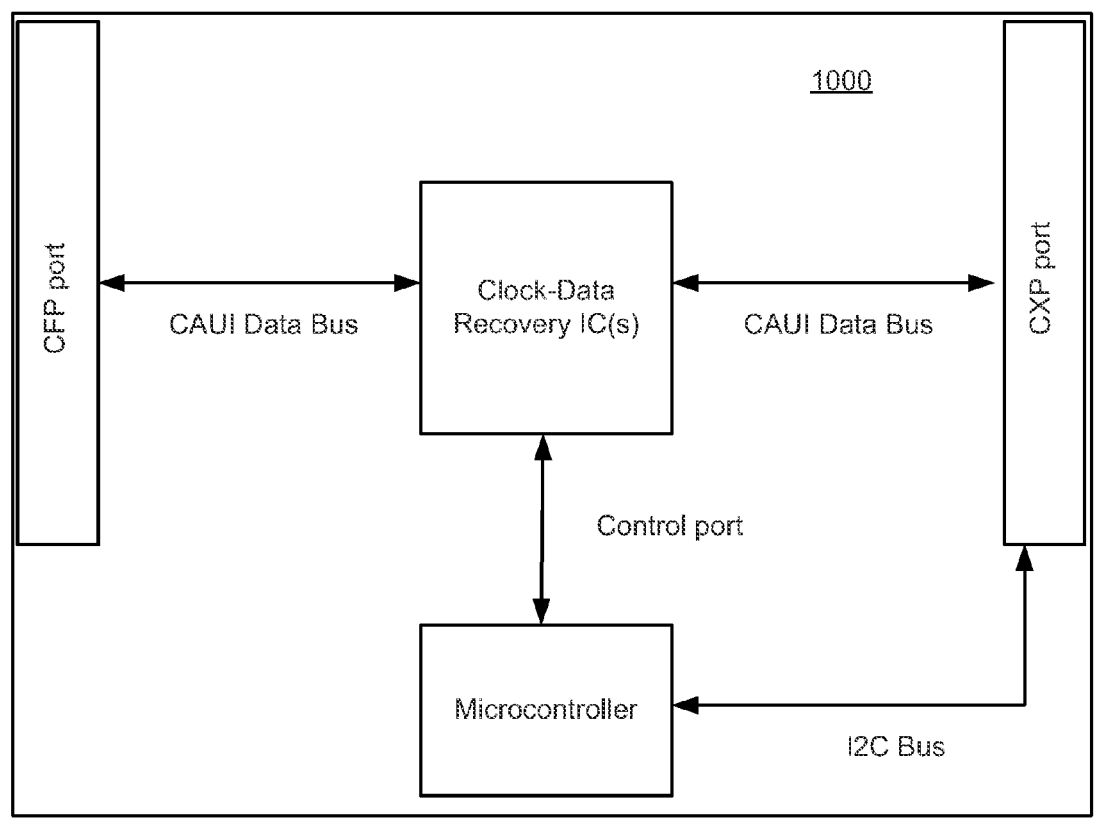
FIG. 10 shows a block diagram of a version of the CFP-CXP adapter with control circuitry for the CDR ICs in the CFP-CXP adapter itself.

FIGS. 9-10 shows different versions of the CFP-CXP adapter in a housing.

In both versions, the CFP-CXP adapter includes a CXP port, one or more clock and data recovery (CDR) integrated circuits, and a CFP port.

The CXP port includes a receptacle to connect with the CXP cable connector for the short haul copper cable or short haul optical fiber.

The CFP port connects with the CFP module of the 100 Gigabit Ethernet port of the 100 Gigabit networking equipment.

The CDR ICs improve the signal quality of the electrical CXP signals to enable use of the low cost passive copper cabling. The CDR ICs can implement such functions as transmit amplitude adjustment, transmit pre-emphasis, transmit post-emphasis and receive equalization to correct for losses and reflections caused by the passive copper cable. Passive copper cable lengths have been tested up to about 3 meters in length. Different implementations could use longer lengths of cable.

The CDR ICs functions are discussed in additional detail. The various CDR ICs functions are performed in both directions, in the CXP port-to-CFP port direction, and in the CFP port-to-CXP port direction. The CDR ICs receive data, recover the embedded clock from the data and then transmit the data back out again, using the recovered clock as the timing source. The CDR ICs may apply an equalizer function to the signal in order to receive the data correctly. The CDR ICs may also intentionally pre-distort the outgoing data in order to compensate for high frequency losses of the transmission media. The amount and type of necessary distortion (pre-emphasis or post-emphasis) depends on the losses in the media such as copper or optical fiber. For various media, the losses are a function of the length of the particular medium. In order to properly tune the output pre-distortion, the control circuitry determines the length of the medium, such as copper or optical fiber.

The versions of the CFP-CXP adapter vary in the location of control circuitry for the CDR ICs. In the apparatus 900 of FIG. 9, the control circuitry for the CDR ICs is in the 100 Gigabit networking equipment which has the 100 Gigabit Ethernet port with the CFP module. In FIG. 10, the control circuitry for the CDR ICs is in the CFP-CXP adapter itself.

Comparing the embodiments of FIGS. 9 and 10, the CDR port and the CXP port are similar, but with a different master for the control circuitry of the I2C bus. The microcontroller in FIG. 10 sets up the CDR settings, whereas the adapter in FIG. 9 works out of the box. The FIG. 9 embodiment allows adjustment of the CDR settings from the network equipment. Although the illustrated embodiments use an I2C bus, other buses can be used to carry control signals, including synchronous or asynchronous buses.

In the apparatus 900 of FIG. 9, compatible I2C (Inter-Integrated Circuit) control circuitry is in the 100 Gigabit networking equipment on the CFP side. For the I2C port, the Management Data Input/Output (MDIO) pins can be reused from the CFP bus. The CFP MSA Hardware Specification revision 1.4 7 Jun. 2010 (incorporated by reference) describes that the CFP hardware signaling pins include 8 pins dedicated to the MDIO interface, which is further described in the CFP MSA Management Interface Specification Version 1.4 Jun. 22, 2010 (incorporated by reference). The I2C hardware/software interface can control the CDR ICs and interrogate the storage such as an EEPROM on the proximate side of the short haul CXP copper cable or optical fiber, such as in the connector. In one example, the EEPROM is programmed by the cable or fiber manufacturer. The contents of the EEPROM are dictated by, for example, as part number, manufacturer, serial number, and supported media such as multi-mode single mode and medium length. In one example, the EEPROM supports the CXP specification, and the process to setup CDRs interrogates the EEPROM of the CXP adapter to read out the contents of the EEPROM. Examples of such contents are in the Supplement to InfiniBand Architecture Specification Volume 2 Physical Specifications, Annex A6 120 Gb/s 12× Small Form-factor Pluggable (CXP) Interface Specification for Cables, Active Cables, & Transceivers, September 2009 (incorporated by reference). Table 25 which shows the memory map for the first upper page, page 00h, for both Tx and Rx addresses, has bytes 135-138 (87h-8Ah) which relate to attenuation of copper cable in dB at 2.5 GHz, 5 GHz, and 10 GHz, as well as tolerance of nominal attenuation at Max per-channel bit rate. Because these attenuation values are read from the EEPROM, this is an adaptive solution that automatically adapts to the particular cable that is actually used by the end user of networking equipment and test equipment.

Alternatively, these bytes relate to the nominal laser wavelength which is the stored value/20, as well as tolerance of wavelength. Also, byte 130 (82h) stores a value indicating cable type, such as passive copper, active copper, active optical.

Compatible I2C control circuitry is a feature that is not part of the CFP MultiSource Agreement. The revision history of the CFP MultiSource Agreement notes that the I2C interface will not be supported.

The I2C hardware/software interface has the flexibility of tuning the CDR ICs' settings interactively. The correct settings of the CDR ICs for error free operation are not always apparent and some adjustment may be required. Because this version of the CFP-CXP adapter relies on the control circuitry in the 100 Gigabit networking equipment on the CFP side, this version of the CFP-CXP adapter does not function if the 100 Gigabit networking equipment on the CFP side has a configuration of the CFP module which excludes the I2C hardware/software interface.

The following provides details of an example implementation of the I2C hardware/software interface.

- A management interface, as already commonly used in other form factors like GBIC, SFP, XFP and QSFP is specified in order to enable flexible use of the transceiver by the user. The specification has been modeled on the definition of the QSFP (Quad Small Form-factor Pluggable) multi-lane re-ceiver, with extensions as needed to support 12-lane operation, at up to (120+120) Gb/s. Some timing requirements are critical, especially for a multi-lane device, so the interface speed has been increased relative to single-lane devices such as GBIC, SFP, and XFP.
- Management signaling logic levels are based on Low Voltage CMOS op-erating at 3.3V Vcc. Host shall use a pull-up to Vcc3.3 for the 2-wire inter-face SCL (clock), SDA (address & data), and Int_L/Reset_L signals.
- CXP memory may be accessed in either single-byte or multiple-byte memory blocks. The largest multiple-byte contiguous write operation that a module shall handle is 4 bytes. The minimum size write block is 1 byte.
- Serial Clock (SCL): The host supplied SCL input to CXP transceivers is used to positive-edge clock data into each CXP device and negative-edge clock data out of each device. The SCL line may be pulled low by a CXP module during clock stretching.
- Serial Data (SDA): The SDA signal is bidirectional for serial data transfer. This signal is open-drain or open-collector driven and may be wire-ORed with multiple open-drain or open collector devices, limited by aggregate capacitance vs. clock speed.
- Master/Slave: CXP transceivers operate only as slave devices. The host must provide a bus master for SCL and initiate all read/write communication.
- Device Address: All CXP modules use the same base addresses, 1010 000x and 1010 100x, where x indicates read (1) or write(0). Each CXP module supports an internal memory map, with one or more 128B lower page and one or more 128B upper pages, depending on module capabilities. See Section 7.6 for memory map structure within each module.
- Clock and Data Transitions: The SDA signal is normally pulled high in the host. Data on the SDA signal may change only during SCL low time periods. Data changes during SCL high periods indicate a START or STOP condition. All addresses and data words are serially transmitted to and from the CXP in 8-bit words. Every byte on the SDA line must be 8-bits long. Data is transferred with the most significant bit (MSB) first.
- START Condition: A high-to-low transition of SDA with SCL high is a START condition, which must precede any other command.
- STOP Condition: A low-to-high transition of SDA with SCL high is a STOP condition.
- Acknowledge: After sending each 8-bit word, the transmitter releases the SDA line for one bit time, during which the receiver is allowed to pull SDA low (zero) to acknowledge (ACK) that it has received each word. Device address bytes and write data bytes initiated by the host shall be acknowledged by CXP transceivers. Read data bytes transmitted by CXP transceivers shall be acknowledged by the host for all but the final byte read, for which the host shall respond with a STOP instead of an ACK.

In the apparatus 1000 of FIG. 10, a compatible I2C (Inter-Integrated Circuit) hardware/software interface is in a microcontroller that is in the CFP-CXP adapter itself. This version of the CFP-CXP adapter does not require control circuitry for the CDR ICs to be resident in the 100 Gigabit networking equipment which has the 100 Gigabit Ethernet port with the CFP module. Accordingly, this version of the CFP-CXP adapter can function with a wider variety of networking equipment.

The microcontroller has a CPU (Central Processing Unit), permanent code storage such as flash memory, ROM, or other nonvolatile memory; and temporary code storage for variables and call stack such as SRAM memory, RAM, or other volatile memory. The nonvolatile memory contains CPU instructions that form functions.

In one embodiment, the code of the microcontroller is fixed. The code has a look-up-table to set up CDR's a particular way depending on the readout of the EEPROM data. In another embodiment, the code of the microcontroller is adjustable to change the look-up-table in the microcontroller.

The microcontroller performs the following functions:

1. Access the I2C EEPROM or other storage in the 100 Gigabit networking equipment on the proximate side of the short haul CXP copper cable or optical fiber (for example, in the connector, programmed by the cable or fiber manufacturer) to determine the length of medium, or attenuation. Aspects of the EEPROM or other storage are discussed above.

2. Look up in internal memory or other accessible storage the appropriate CDR settings for this length of short haul medium, or attenuation of short haul medium.

3. Program the appropriate CDR settings into the CDR IC's via the control interface.

In the different versions of the CFP-CXP adapter shown in FIGS. 9-10, a CAUI data bus couples the CFP port and the CDR IC's, and another CAUI data bus couples the CXP port and the CDR IC's.

CAUI is a 100G AUI (Attachment Unit Interface), where C is the Roman numeral for 100. The following provides details of an example implementation of the CAUI specification such as IEEE 802.3ba Annex 83A CAUI chip-to-chip and 83B CAUI chip-to-module (all of which are incorporated by reference herein).

The purpose of CAUI is to provide a flexible chip-to-chip and chip-module interconnect for 40 Gb/s or 100 Gb/s components Annex 83A provides compliance requirements for XLAUI/CAUI transmitters and receivers while Annex 83B specifies the electrical requirements for the chipmodule interconnection.

The CAUI allows interconnect distances of approximately 25 cm over printed circuit board including one connector, see 83A.4. An example application of CAUI includes providing a physical connection between a ten-lane 100 Gb/s PMA and a 10:4 PMA mapping element. The CAUI interface has the following characteristics:
  a) Independent transmit and receive data paths
  b) Differential AC coupled signaling with low voltage swing
  c) Self-timed interface
  d) Shared technology with other 100 Gb/s interfaces
  e) Utilization of 64B/66B coding The following is a list of major concepts of CAUI:
  a) The CAUI interface can be inserted between PMA layers in the IEEE 802.3 CSMA/CD LAN model to transparently enable chip-to-chip communication
  b) The CAUI is organized into ten lanes
  c) The CAUI interface is a parallel electrical interface with each lane running at a nominal rate of 10.3125 Gb/s The CAUI interface supports the 100 Gb/s data rate. For 100 Gb/s applications, the data stream shall be presented in ten lanes as described in Clause 83. The data is 64B/66B coded. The nominal signaling rate for each lane in 100 Gb/s applications shall be 10.3125 Gb/s.

The CAUI is a low-swing AC coupled differential interface. AC coupling allows for interoperability between components operating from different supply voltages. Differential signal swings depend on several factors such as transmitter de-emphasis and transmission line losses.

The CAUI signal paths are point-to-point connections. Each path corresponds to a CAUI lane, and is comprised of two complementary signals making a balanced differential pair. For CAUI, there are ten differential paths in each direction for a total of twenty pairs, or 40 connections.

The CAUI receiver shall be AC coupled to the CAUI transmitter to allow for maximum interoperability between various 10 Gb/s components. AC coupling is considered to be part of the receiver except, for example, when interfacing with modules defined in Annex 83B. It should be noted that there may be various methods for AC coupling in actual implementations.

The CAUI is primarily intended as a point-to-point interface of up to approximately 25 cm between integrated circuits using controlled impedance traces on low-cost printed circuit boards (PCBs). Longer reaches for the CAUI may be achieved by the use of better PCB materials, as the performance of an actual CAUI interconnect is highly dependent on the implementation.

The recommended differential characteristic impedance of circuit board trace pairs is 100Ω±10%.

In some embodiments, the CFP transceiver port is any of a CFP port, CFP2 port, CFP4 port, or other variant of CFP port. CFP supports a CAUI bus which has 10 lanes of 10 Gigabit per second. The CDRs would switch to 10 Gigabit per second CDRs. CFP2 and CFP4 switch to 4 lanes of 25 Gigabit per second. The CDRs would switch to 25 Gigabit per second CDRs.

In some embodiments, the CXP transceiver port is any of a CXP port, CXP2 port, or other variant of CXP port.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. An apparatus comprising:
  a housing including:
    a C eXtended-capability Pluggable (CXP) transceiver port compliant with a CXP specification operating at least at 100 Gbps;
    a C Form-factor Pluggable (CFP) transceiver port compliant with a CFP specification operating at least at 100 Gbps; and
    circuitry compensating for attenuation of a CXP interconnect connected to the CXP transceiver port, and converting between (i) electrical CXP signals of the CXP transceiver port, the electrical CXP signals compliant with the CXP specification, and (ii) CFP signals of the CFP transceiver port, the CFP signals compliant with the CFP specification.

2. The apparatus of claim 1, wherein the circuitry includes a microcontroller that configures clock and data recovery settings for converting between the electrical CXP signals and the CFP signals.

3. The apparatus of claim 1, wherein the transceiver adapter relies on circuitry external to the transceiver adapter to control clock and data recovery settings for converting between the electrical CXP signals and the CFP signals.

4. The apparatus of claim 1, wherein the circuitry converting between signals, includes clock and data recovery circuitry configured based on attenuation data characterizing a CXP interconnect coupled to the CXP transceiver port, the attenuation data stored on the CXP interconnect.

5. The apparatus of claim 1, wherein the CFP specification describes any CFP variant including any of CFP, CFP2, CFP4, or other variant of CFP.

6. The apparatus of claim 1, wherein the CFP specification is a C Form-factor Pluggable MultiSource Agreement specification.

7. The apparatus of claim 1, wherein the CXP specification is any CXP variant including any of CXP, CXP2, or other variant of CXP.

8. The apparatus of claim 1, wherein the CXP specification is a C eXtended-capability Pluggable form factor specification.

9. An apparatus including:
  a networking device having an Ethernet port operating at least at 100 Gigabits, the networking device including a C Form-factor Pluggable (CFP) module, the CFP module coupled to a transceiver adapter, the transceiver adapter comprising:
    a housing including:
      a C eXtended-capability Pluggable (CFP) transceiver port compliant with a CXP specification operating at least at 100 Gbps;
      a CFP transceiver port compliant with a CFP specification operating at least at 100 Gbps; and
      circuitry compensating for attenuation of a CXP interconnect connected to the CXP transceiver port, and converting between (i) electrical CXP signals of the CXP transceiver port, the electrical CXP signals compliant with the CXP specification, and (ii) CFP signals of the CFP transceiver port, the CFP signals compliant with the CFP specification.

10. The apparatus of claim 9, wherein the circuitry in the transceiver adapter includes a microcontroller that configures clock and data recovery settings for converting between the electrical CXP signals and the CFP signals.

11. The apparatus of claim 9, wherein the transceiver adapter relies on circuitry in the networking device and external to the transceiver adapter, to control clock and data recovery settings for converting between the electrical CXP signals and the CFP signals.

12. The apparatus of claim 9, wherein the circuitry converting between signals, includes clock and data recovery circuitry configured based on attenuation data characterizing a CXP interconnect coupled to the CXP transceiver port, the attenuation data stored on the CXP interconnect.

13. The apparatus of claim 9, wherein the CFP specification describes any CFP variant including any of CFP, CFP2, CFP4, or other variant of CFP.

14. The apparatus of claim 9, wherein the CFP specification is a C Form-factor Pluggable MultiSource Agreement specification.

15. The apparatus of claim 9, wherein the CXP specification is any CXP variant including any of CXP, CXP2, or other variant of CXP.

16. The apparatus of claim 9, wherein the CXP specification is a C eXtended-capability Pluggable form factor specification.

17. A method including:
 compensating for attenuation of a C eXtended-capability Pluggable (CXP) interconnect connected to a CXP transceiver port operating at least at 100 Gbps, and
 converting between (i) electrical CXP signals of the CXP transceiver port, the electrical CXP signals and the CXP transceiver port compliant with the CXP specification, and (ii) C Form-factor Pluggable (CFP) signals of a CFP transceiver port operating at least at 100 Gbps, the CFP signals and the CFP transceiver port compliant with the CFP specification, the CXP transceiver port and the CFP transceiver port in a same transceiver adapter housing.

18. The method of claim 17, further comprising:
 configuring clock and data recovery circuitry settings in the transceiver adapter for converting between the electrical CXP signals and the CFP signals, with a microcontroller in the transceiver adapter housing.

19. The method of claim 17, further comprising:
 configuring clock and data recovery circuitry settings in the transceiver adapter for converting between the electrical CXP signals and the CFP signals, with a networking device external to the transceiver adapter.

20. The method of claim 17, further comprising:
 configuring clock and data recovery circuitry settings in the transceiver adapter for converting between the electrical CXP signals and the CFP signals, based on attenuation data characterizing a CXP interconnect coupled to the CXP transceiver port, the attenuation data stored on the CXP interconnect.

21. The method of claim 17, wherein the CFP specification describes any CFP variant including any of CFP, CFP2, CFP4, or other variant of CFP.

22. The method of claim 17, wherein the CFP specification is a C Form-factor Pluggable MultiSource Agreement specification.

23. The method of claim 17, wherein the CXP specification is any CXP variant including any of CXP, CXP2, or other variant of CXP.

24. The method of claim 17, wherein the CXP specification is a C eXtended-capability Pluggable form factor specification.

25. A method including:
 attaching, to a first C Form-factor Pluggable (CFP) port of networking equipment undergoing test, a second CFP port of an apparatus that converts between (i) electrical C eXtended-capability Pluggable (CXP) signals of the CXP transceiver port, the electrical CXP signals compliant with the CXP specification, and (ii) CFP signals of the CFP transceiver port, the CFP signals compliant with the CFP specification;
 attaching, to a first CXP port of the apparatus, a CXP interconnect; and
 automatically configuring the apparatus to compensate for attenuation of the CXP interconnect.

* * * * *

UNITED STATES PATENT AND TRADEMARK OFFICE
CERTIFICATE OF CORRECTION

PATENT NO. : 8,611,830 B2  
APPLICATION NO. : 13/327426  
DATED : December 17, 2013  
INVENTOR(S) : Gabriel K. Au et al.

Page 1 of 1

It is certified that error appears in the above-identified patent and that said Letters Patent is hereby corrected as shown below:

In the Claims

In claim 9, column 10, line 52, after "a C eXtended-capability Pluggable", delete "(CFP)", and insert -- (CXP) --.

Signed and Sealed this
Twentieth Day of May, 2014

Michelle K. Lee
*Deputy Director of the United States Patent and Trademark Office*